(12) United States Patent
Kramer

(10) Patent No.: US 6,913,286 B2
(45) Date of Patent: Jul. 5, 2005

(54) MULTI-PURPOSE ADJUSTABLE CARRIER FOR ALL-TERRAIN VEHICLES

(75) Inventor: Aaron Foster Kramer, Golden, CO (US)

(73) Assignee: Kwik Tek, Inc., Golden, CO (US)

( * ) Notice: Subject to any disclaimer, the term of this patent is extended or adjusted under 35 U.S.C. 154(b) by 212 days.

(21) Appl. No.: 10/133,835

(22) Filed: Apr. 26, 2002

(65) Prior Publication Data

US 2003/0201634 A1 Oct. 30, 2003

(51) Int. Cl.$^7$ ................................................. B60R 9/00
(52) U.S. Cl. ....................... 280/762; 280/769; 211/64; 224/536
(58) Field of Search ................................ 280/727, 762, 280/769; 211/64, 60.1; 224/536, 488, 532, 534, 537; 248/201, 229.15

(56) References Cited

U.S. PATENT DOCUMENTS

| | | | | |
|---|---|---|---|---|
| 2,302,300 A | * | 11/1942 | Davies | 224/559 |
| 2,907,506 A | * | 10/1959 | Sammons | 224/317 |
| 3,477,587 A | * | 11/1969 | Hart | 211/64 |
| 3,659,761 A | * | 5/1972 | Wesson | 224/442 |
| 4,084,735 A | * | 4/1978 | Kappas | 224/328 |
| 4,607,772 A | * | 8/1986 | Hancock | 224/442 |
| 5,078,279 A | * | 1/1992 | Hancock et al. | 211/64 |
| 5,344,032 A | | 9/1994 | Ramsdell | 211/64 |
| 5,347,740 A | | 9/1994 | Rather et al. | 42/94 |
| 5,388,738 A | * | 2/1995 | Russell | 224/482 |
| 5,491,919 A | | 2/1996 | Rather et al. | 42/94 |
| 5,595,333 A | * | 1/1997 | Boston | 224/536 |
| D386,304 S | | 11/1997 | Hancock | D3/262 |
| 5,769,526 A | | 6/1998 | Shaffer | 362/80 |
| 5,915,572 A | | 6/1999 | Hancock | 211/64 |
| 6,142,349 A | * | 11/2000 | Roberson | 224/401 |
| 6,484,913 B1 | * | 11/2002 | Hancock et al. | 224/401 |
| D476,290 S | * | 6/2003 | Gates et al. | D12/408 |

* cited by examiner

Primary Examiner—Christopher P. Ellis
Assistant Examiner—Bridget Avery
(74) Attorney, Agent, or Firm—Sheridan Ross P.C.

(57) ABSTRACT

An adjustable carrier for attachment to a vehicle which includes a holding member that has a first arm and a second arm with at least one aperture and at least one hook. The holding member further includes an intermediate base interconnecting the first arm to the second arm and a resilient strap having at least one opening used to restrain an object within or against the holding member. Means for interconnecting the holding member to the vehicle are also encompassed within the scope of the invention.

9 Claims, 4 Drawing Sheets

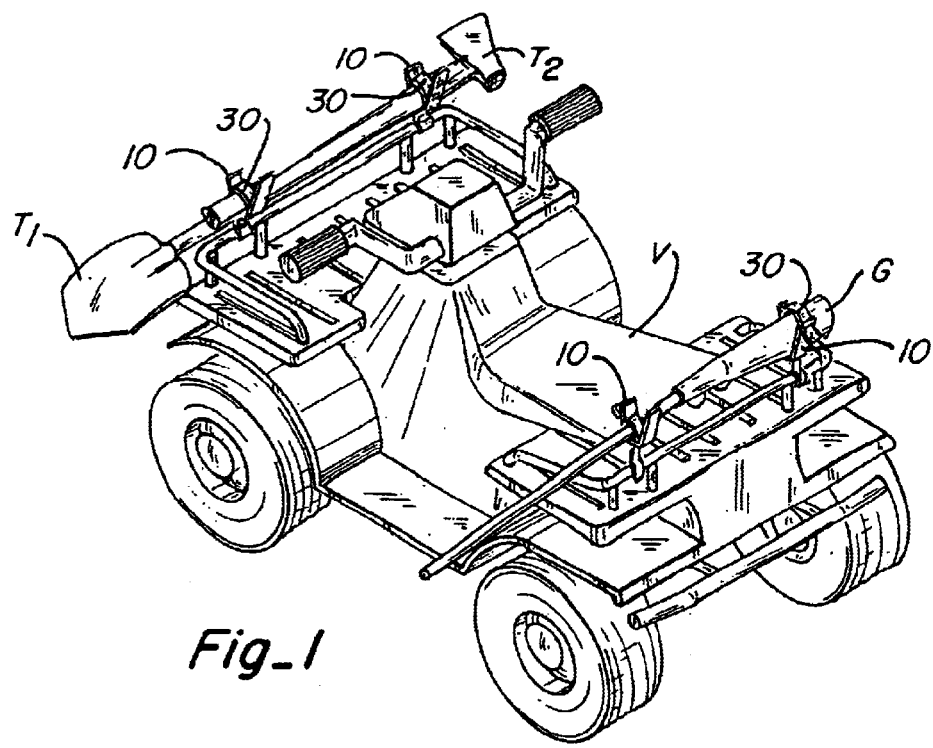
Fig_1
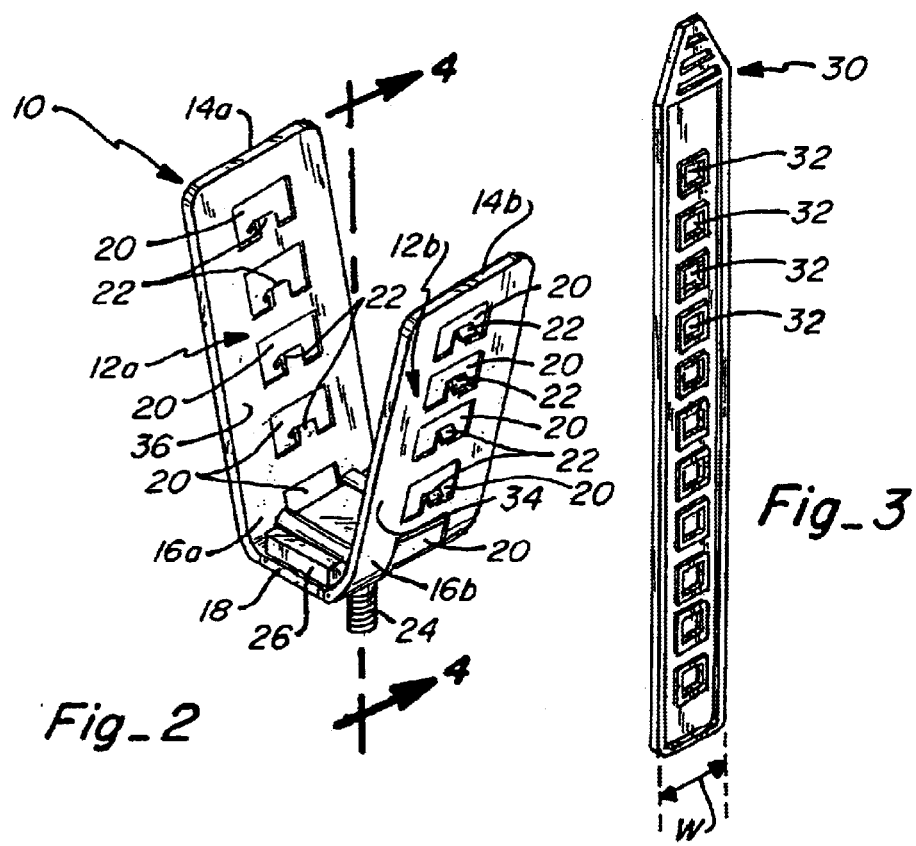
Fig_2
Fig_3

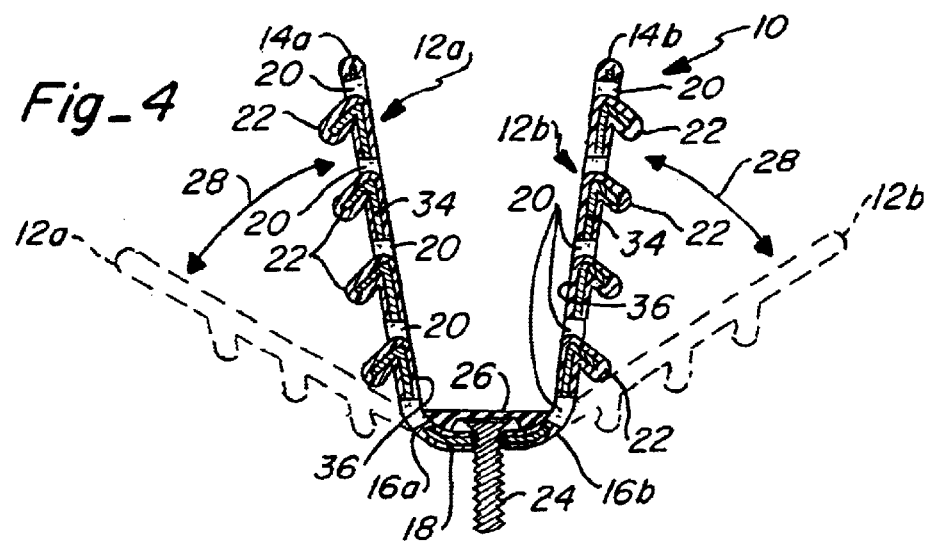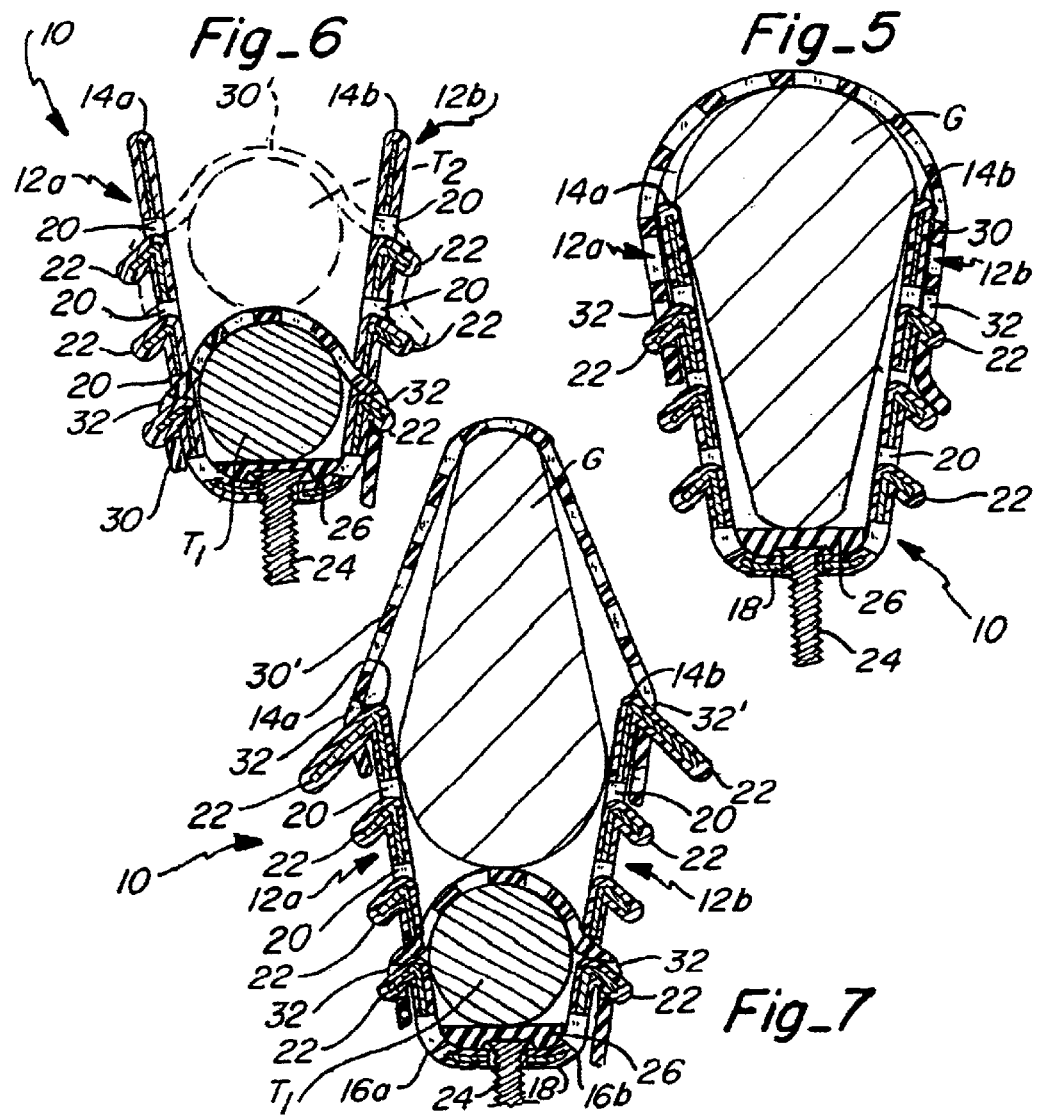

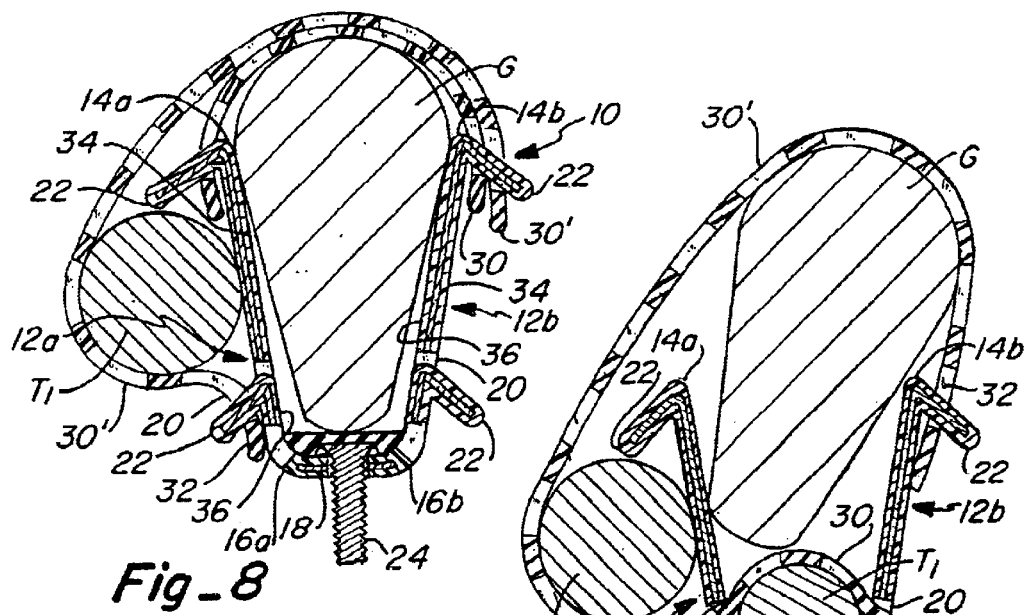
Fig_8
Fig_9
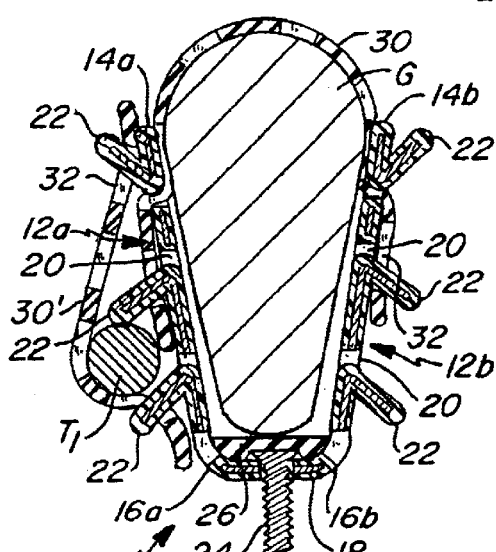
Fig_10
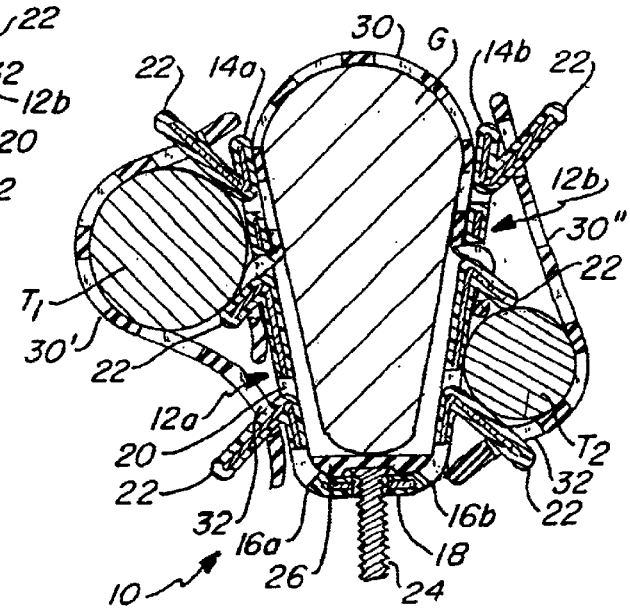
Fig_11

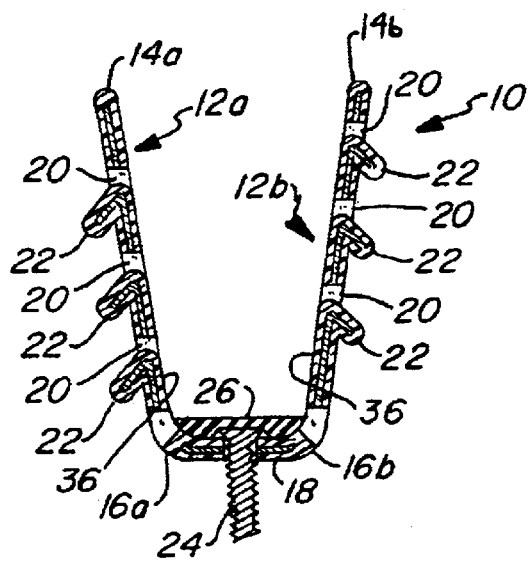
Fig_12
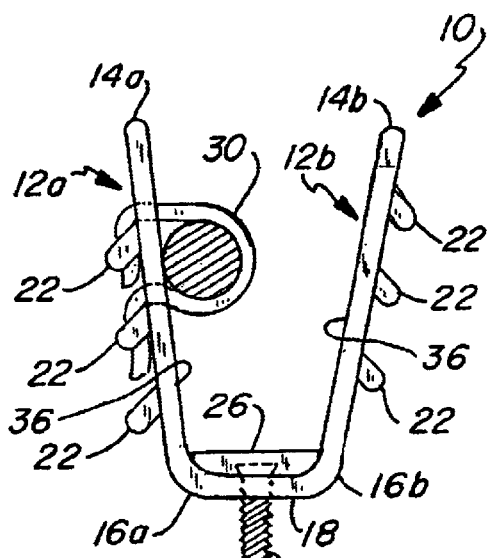
Fig_13
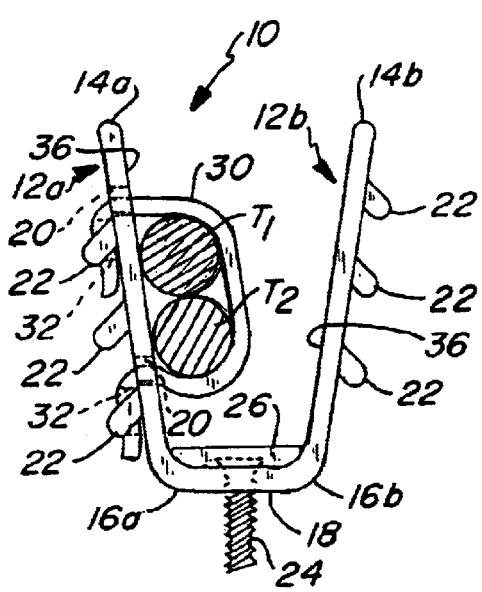
Fig_14
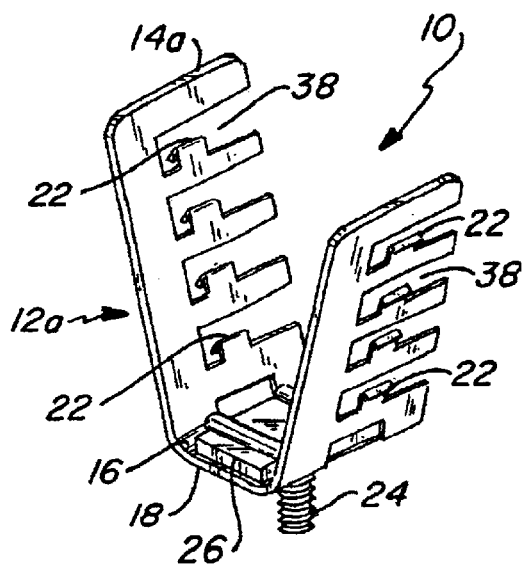
Fig_15

MULTI-PURPOSE ADJUSTABLE CARRIER FOR ALL-TERRAIN VEHICLES

FIELD OF THE INVENTION

The present invention pertains to a device for carrying one or more objects, and in particular, pertains to a device that is adjustable and is attachable to a vehicle, such that it can be used to releasably restrain one or more objects.

BACKGROUND OF THE INVENTION

The use of racks to hold rifles and other sporting equipment, such as bows, fishing rods, etc, is well known. Typically, racks used to hold sporting equipment include a generally U-shaped body for receiving a portion of the rifle stock, and a strap attachable to both sides of the U-shaped body and positionable over the portion of the stock. The strap serves to hold the stock within the U-shaped body and prevent accidental removal.

One problem with the existing racks is that they are not suited to carrying multiple objects. More particularly, existing racks are designed so that an object can be placed within the center portion of the U-shaped body, with a strap placed over the object, thereby holding it in place. However, multiple objects are not easily restrained at the same time, especially if the objects are smaller than the U-shaped area. Manufacturers of existing racks have attempted to solve this problem simply by offering mounts of multiple racks. Thus, if a tool and a gun are to be carried by the same vehicle, a separate set of racks is needed for each object. This adds cost to accomplishing this task because multiple sets of racks are required. In addition, the vehicle may have limited mounting space, thus preventing the use of multiple sets of mounting racks.

Yet another problem with existing racks is that limited use of the rack is achieved by only using the U-shaped area of the rack for storage. That is, the potential exists to carry one or more objects outside of the U-shaped area of the racks as well as to carry multiple objects within the U-shaped area of the rack; unfortunately, prior art racks fail to exploit this available carrying potential.

Still yet another problem with existing racks is that many of them are not flexible. Accordingly, if the object to be restrained is wider than the U-shaped area of the rack, the object cannot be restrained and carried using the rack. Likewise, if the object is substantially narrower than the U-shaped area of the rack, it will either be carried loosely, or the rack simply cannot be used.

To overcome the disadvantages associated with the prior art, there is a need for a device which securely holds multiple objects within one carrier. In addition, there is a need for a device that is flexible and can be adjusted to accept items wider and narrower than a standard U-shaped gun rack.

SUMMARY OF THE INVENTION

The present invention addresses the shortcomings of the prior art. More specifically, it is thus one aspect of the present invention to provide an adjustable carrier that has the ability to carry multiple objects at once. In addition, it is a further aspect of the present invention to provide a carrier that can be easily modified to carry an object that is wider or narrower than a rigid, standard, U-shaped gun rack.

The above and other aspects of the invention are realized in specific illustrated embodiments of the invention. Considering the features of the invention, in one aspect of the present invention an adjustable carrier for attachment to a vehicle such as an all-terrain vehicle ("ATV") is disclosed, wherein the carrier includes a holding member that includes a first arm and a second arm, each having an upper end and a lower end. The first arm and second arm each have at least one aperture and at least one hook. The holding member further includes an intermediate base interconnecting the first arm to the second arm at the lower ends of each arm. A resilient strap is used in conjunction with the holding member. The resilient strap has at least one opening, and more preferably, at least two openings. Finally, means for interconnecting the holding member to the vehicle are also encompassed within the scope of the invention.

In a modification to the first embodiment of the present invention, an adjustable carrier for attachment to a vehicle is provided, wherein the carrier can be used to releasably restrain at least one article. The carrier features a flexible holding member including a first arm and a second arm. The first arm and the second arm each have a plurality of apertures and a plurality of hooks. The flexible holding member further includes an intermediate base interconnecting the lower end of the first arm to the lower end of the second arm. The flexible holding member is used in conjunction with a tension strap having a plurality of openings. Means for interconnecting said flexible holding member to the vehicle are also encompassed by this modification. In use, a first opening in the tension strap is placed to engage a first of the plurality of hooks. In addition, a second of opening in the tension strap is placed to engage a second of the plurality of hooks. An article is releasably restrained by the tension strap and the flexible holding member between the first opening and the second opening in the tension strap.

Thus, in one aspect of the present invention, an adjustable carrier for attachment to a vehicle is provided for selectively holding an object, and comprising: a first elongated arm having an upper end and a lower end, a second elongated arm having an upper end and a lower end, a base operably interconnecting the lower end of the first elongated arm and the lower end of the second elongated arm, a plurality of apertures positioned between the upper end and the lower end of the first elongated arm and the second elongated arm, at least one hook portion positioned proximate to the plurality of apertures, a resilient strap having a width adapted to extend through the plurality of apertures and having a plurality of apertures adapted for interconnecting to the at least one hook portion, and an attachment means for interconnecting the base to the vehicle. The resilient strap may be operably interwoven through the plurality of apertures to selectively interconnect the object on an interior surface or an exterior surface of each of the first elongated arm and the second elongated arm.

Additional advantages of the present invention will become readily apparent from the following discussion, particularly when taken together with the accompanying drawings.

BRIEF DESCRIPTION OF THE DRAWINGS

FIG. 1 is a perspective view of the multi-use carrier of the present invention mounted on an all-terrain vehicle;

FIG. 2 is a perspective view of one embodiment of a multi-use carrier of the present invention;

FIG. 3 is a perspective view of a resilient strap used in conjunction with the device shown in FIG. 2;

FIG. 4 is a cross-sectional end view of the device shown in FIG. 3, and includes phantom lines illustrating the flexible nature of the device;

FIG. 5 is a front elevation view of one embodiment of the present invention, showing the device used to hold a single object between its two elongated arms, and wherein the object is restrained by a single strap;

FIG. 6 is a front elevation view of one embodiment of the present invention, showing the device used to hold two cylindrical objects within its two arms, each object restrained by a separate strap;

FIG. 7 is a front elevation view of a modification of the first embodiment, wherein the device includes two elongated hooks, and wherein the device is used to hold one cylindrical object and one oblong-shaped object within its two arms, each object restrained by a separate strap;

FIG. 8 is a front elevation view of a further modification of the first embodiment, wherein the device includes a total of four elongated hooks, and wherein the device is used to hold one cylindrical object to the exterior of one arm and an oblong-shaped object within its two arms, each object restrained by a separate strap;

FIG. 9 is a front elevation view of the device depicted in FIG. 8, wherein the device is used to hold one cylindrical object to the exterior of one arm, and a cylindrical object and an oblong-shaped object within its two arms;

FIG. 10 is a front elevation view of yet a further modification of the first embodiment that includes some upwardly projecting hooks in combination with downwardly projecting hooks, and wherein the device is used to hold multiple objects;

FIG. 11 is a front elevation view of a modification of the device shown in FIG. 10, wherein the upwardly projecting hooks and some, but not all of the downwardly projecting hooks are elongated, and wherein the device is used to hold multiple objects;

FIG. 12 is a front elevation view of an alternative embodiment of the present invention, wherein the hooks on one arm are offset relative to the elevation of the hooks on the other arm;

FIG. 13 is a front elevation view of the device shown in FIG. 12, wherein a single cylindrical-shaped object is held to the interior surface of one elongated arm using a single strap;

FIG. 14 is a front elevation view of the device shown in FIG. 12, wherein two cylindrical-shaped objects are held to the interior of one arm using a single strap; and FIG. 15 is a front perspective view of an alternative embodiment of the present invention, wherein a plurality of slots are provided in the first and second elongate arms to facilitate insertion of the strap.

While the following disclosure describes the invention in connection with those embodiments presented, one should understand that the invention is not strictly limited to these embodiments. Furthermore, one should understand that the drawings are not necessarily to scale, and that in certain instances, the disclosure may not include details which are not necessary for an understanding of the present invention, such as conventional details of fabrication and assembly.

DETAILED DESCRIPTION OF THE INVENTION

Referring initially to FIG. 1, although the present invention can be seen mounted to an all-terrain vehicle, the invention may be used with any type of vehicle, including Jeeps, motorcycles, bicycles, etc. (herein "vehicles"). The present invention generally comprises an adjustable carrier 10 and a resilient strap 30 utilizing some type of means for attachment to the vehicle, such as hardware generally known to those skilled in the art. Tools $T_1$, $T_2$ or gun G may be placed within the adjustable carrier 10, and secured in place using the resilient strap 30.

Referring now to FIG. 2, the adjustable carrier 10 is depicted in a perspective view. Carrier 10 generally includes a first elongated arm 12a, and a second elongated arm 12b. The first elongated arm 12a further includes an upper end 14a and a lower end 16a. Similarly, second elongated arm 12b includes an upper end 14b and a lower end 16b. Elongated arms 12a and 12b have an exterior surface 34 and an interior surface 36. Interconnecting the first elongated arm 12a to the second elongated arm 12b is a base 18. More particularly, the lower end 16a of the first elongated arm 12a is interconnected to the lower end 16b of the second elongated arm 12b by base 18, and which generally forms a "U" shaped cradle in one embodiment of the present invention. The first elongated arm 12a further includes at least one, but more preferably, a plurality of apertures 20. Similarly, the second elongated arm 12b also includes at least one, but more preferably, a plurality of apertures 20. Positioned proximate to the apertures 20 is a hook portion 22, and in alternative embodiments a plurality of hook portions 22, and more preferably, one hook portion 22 per aperture 20. The embodiment shown in FIG. 2 includes five apertures 20 along each of the first elongated arm 12a and second elongated arm 12b. In addition, the embodiment depicted in FIG. 2 further includes hook portions 22 positioned proximate the upper four apertures 20 and positioned along each of the first elongated arm 12a and second elongated arm 12b.

Also depicted in FIG. 2, an attachment mechanism 24 is provided for interconnecting the adjustable carrier 10 to a vehicle V. In FIG. 2, a threaded post can be seen extending from base 18 and which is adapted to operably interconnect a mounting bracket (not shown) that is threaded or used in combination with a nut or other threaded attachment hardware. However, it is to be understood that alternate means of interconnecting the adjustable carrier 10 to a vehicle V are envisioned within the scope of the present invention. For example, the attachment mechanism 24 may include various types of clamps or various pieces of bracketing hardware that allow adjustable carrier 10 to be mounted to a vehicle V.

The adjustable carrier 10 may include a cushion 26 located between first elongated arm 12a and second elongated arm 12b at the upper surface of base 18. The cushion 26 is preferably made of a relatively soft material such as rubber or foam, and provides some measure of shock protection to an object carried within adjustable carrier 10.

Referring now to FIG. 3, a resilient strap 30 is generally used in conjunction with adjustable carrier 10 as depicted. The resilient strap 30 is generally a stretchable material such as elastic, plastic, or rubber that is capable of being threaded through aperture 20 of the adjustable carrier 10 and interlocked or engaged with hook portions 22 of the adjustable carrier 10. More particularly, strap 30 includes at least one, but more preferably, a plurality of openings or apertures 32. Furthermore, the resilient strap 30 has a width W that allows strap 30 to be inserted through an aperture 20 of the adjustable carrier 10. Upon insertion through an aperture 20 of adjustable carrier 10, the resilient strap 30 is pulled and stretched to provide tension within the strap 30. The tension within the strap 30 is used to secure an object within the adjustable carrier 10 as an aperture 32 of the resilient strap 30 is engaged with a hook portion 22 of the adjustable carrier 10.

FIG. 4 is a cross-sectional end view of one embodiment of the adjustable carrier 10. This view further illustrates the versatile features of the present invention. More specifically, the first elongated arm 12a and second elongated arm 12b are shown in solid and phantom lines. The phantom lines represent one possible position for the first elongated arm 12a and the second elongated arm 12b upon widening the adjustable carrier 10. Arrows 28 illustrate how the elongated arms 12a, 12b may be rotated into a wide configuration, thus allowing the width between the elongated arms to be selectively adjusted. Alternately, the elongated arms 12a, 12b may be flexed to a narrower position than those illustrated in solid lines. The flexible nature of the adjustable carrier 10 is a result of the nature of materials used to construct the adjustable carrier 10. More specifically, the adjustable carrier 10 is preferably constructed of a selectively adjustable material, such as a metal or metal alloy. More preferably, the adjustable carrier 10 is formed of a plastic-coated steel U-shaped member, such as poly-vinyl chloride (PVC) coated steel.

Referring now to FIG. 5, an object G is shown restrained within the adjustable carrier 10. The adjustable carrier 10 as depicted in FIG. 5 has been modified from that shown in FIGS. 2 and 4 to include only three hook portions 22 along both the first elongated arm 12a and the second elongated arm 12b. The resilient strap 30 is shown stretched over object G such that a first aperture 32 of strap 30 engages a first hook portion 22 disposed on the first elongated arm 12a, and a second aperture 32 engages a second hook portion 22 of the second elongated arm 12b. Finally, a cushion 26 is shown disposed along the upper surface of base 18, and which is used to provide shock protection to object G restrained within holding member 10.

Referring now to FIG. 6, the adjustable carrier 10 of FIG. 5 is illustrated carrying two objects between the first elongated arm 12a and the second elongated arm 12b. More particularly, a first object such as tool $T_1$, is seen positioned within the lower region between the first elongated arm 12a and second elongated arm 12b. In addition, a first strap 30 is shown restraining first object $T_1$ and is interwoven through a first aperture 20 within the first elongated arm 12a, and a first aperture 32 of strap 30 is engaged over a first hook portion 22 of the first elongated arm 12a. At the opposite end of strap 30, a second aperture 32 within strap 30 is illustrated engaging a first hook portion 22 of the second elongated arm 12b. Accordingly, the first strap 30 is stretched and positioned to engage the hook portions 22 on both the first elongated arm 12a and the second elongated arm 12b, thereby restraining the first object $T_1$ within the lower portion of the adjustable carrier 10.

Adjustable carrier 10, as depicted in FIG. 6, also allows for restraining a second object such as the handle of a tool $T_2$. Here, strap 30' is interwoven through a second aperture 20 within the first elongated member 12a and engaged with a second hook portion 22. In a similar manner, the opposite end of strap 30' is interwoven through a second aperture 20 within the second elongated arm 12b and engaged with a second hook portion 22 of the second elongated arm 12b. Accordingly, adjustable carrier 10 may be used to restrain multiple objects between its first elongated arm 12a and second elongated arm 12b utilizing separate resilient straps 30 and 30'.

Referring now to FIG. 7, a modified adjustable carrier 10 is depicted holding two objects $T_1$ and G, within the first elongated arm 12a and the second elongated arm 12b. The adjustable carrier 10, as depicted in FIG. 7, includes four hook portions 22 along both the first elongated arm 12a and the second elongated arm 12b. However, the upper-most hook portions 22 positioned on the first elongated arm 12a and the second elongated arm 12b are extended or longer than the remaining hook portions 22 of adjustable carrier 10. Accordingly, hook portions 22 of various lengths may be used in combination with adjustable carrier 10 of the present invention.

Referring now to FIG. 8, still yet another embodiment of the adjustable carrier 10 of the present invention is provided and which includes only two elongated hook portions 22 along each of the first elongated arm 12a and the second elongated arm 12b. As seen in FIG. 8, a first object G may be restrained between the first elongated arm 12a and the second elongated arm 12b, while a second object $T_1$ is restrained adjacent the exterior surface 34 of first elongated arm 12a. Specifically, object G is held in place by placing resilient strap 30 over object G such that a first aperture 32 of the resilient strap 30 is placed to engage a first hook portion 22 located at the upper end 14a of the first elongated arm 12a, and a second aperture 32 located at the opposite end of resilient strap 30 is placed to engage the hook portion 22 located at the upper end 14b of the second elongated arm 12b, thereby restraining object G. A second object $T_1$ is restrained to the exterior of the first elongated arm 12a by placing a first aperture 32 of resilient strap 30' to engage a first hook portion 22 at the lower end 16a of first elongated arm 12a, and by placing a second aperture 32 located at the opposite end of the resilient strap 30' to engage a second hook portion 22 located at the upper end 14b of the second elongated arm 12b. Accordingly, it is one aspect of the present invention to provide for variable length hook portions 22 that allow for engagement by multiple resilient straps 30, and which can be used for a variety of applications.

Referring now to FIG. 9, the modified adjustable carrier 10 depicted in FIG. 8 is provided with two sets of elongated hook portions 22 positioned along the elongated arms 12a and 12b. Here, object $T_1$ s restrained between the first elongated arm 12a and the second elongated arm 12b using a first resilient strap 30 that is interwoven through the first elongated arm 12a and the second elongated arm 12b at apertures 20, and is engaged at hook portions 22 positioned at the lower ends 16a and 16b of the elongated arms 12a and 12b. In addition, object G positioned between the first elongated arm 12a and the second elongated arm 12b and above object $T_1$ is restrained, together with object $T_2$ to the exterior of the first elongated arm 12a, using a second resilient strap 30'. More particularly, the second resilient strap 30' can be seen engaging hook portion 22 at the lower end 16a of first elongated arm 12a, while the opposite end of second resilient strap 30' is seen engaging a second hook portion 22 at the upper end 14b of second elongated arm 12b. Therefore, the adjustable carrier 10 may be formed using elongated hook portions 22 which allow engagement by more than one resilient strap 30 at each hook portion 22. As a result, the adjustable carrier 10 can be used with multiple straps to restrain multiple objects.

Referring now to FIG. 10, a modified adjustable carrier 10 is depicted that includes two downwardly projecting hook portions 22 and one upwardly projecting hook portion 22 positioned along both the first elongated arm 12a and the second elongated arm 12b. Therefore, it is one aspect of the present invention to provide an adjustable carrier 10 that has hook portions that project both downwardly and upwardly. As shown in FIG. 10, a first object G is restrained between the first elongated arm 12a and the second elongated arm 12b using a first resilient strap 30. More particularly, object G is restrained by interweaving resilient strap 30 through a first aperture 20 located near the upper end 14a of the first elongated arm 12a and engaging a downwardly projecting hook portion 22 located within the middle of the first elongated arm 12a. Object G is further restrained by interweaving the opposite end of resilient strap 30 through a first aperture 20 located toward the upper end 14b of the second elongated arm 12b, and engaging resilient strap 30' with hook portion 22 located within the middle region of the second elongated arm 12b.

In addition, FIG. 10 illustrates second object $T_1$ restrained to the exterior of the first elongated arm 12a using a second resilient strap 30'. More specifically, object $T_1$ is restrained by engaging a first aperture 32 over hook portion 22 located at the lower end 16a of the first elongated arm 12a, and further engaging a second aperture 32 at the opposite end of resilient strap 30' over an upwardly projecting hook portion 22 positioned at the upper end 14a of the first elongated arm 12a.

Referring now to FIG. 11, the modified holding member as depicted in FIG. 10 is further illustrated restraining three objects using multiple straps. Specifically, the first object G is restrained between the first elongated arm 12a and the second elongated arm 12b using a single strap that is interwoven through apertures 20 and engaged with hook portions 22 along both the first elongated arm 12a and the second elongated arm 12b. Object $T_1$ is shown restrained to the exterior of the first elongated arm 12a using a separate restraining member 30' engaged with downwardly projecting hook portion 22 and upwardly projecting hook portion 22 situated at either end of the first elongated arm 12a. In addition, a third object $T_2$ is restrained to the exterior of the second elongated arm 12b by engaging apertures 32 of a third resilient strap 30" which is engaged with a downwardly projecting hook portion 22 and an upwardly projecting hook portion 22 at either end of the second elongated arm 12b.

Referring now to FIG. 12, yet another modified version of the adjustable carrier 10 is depicted that includes hook portions 22 that are offset in elevation between the first elongated arm 12a and the second elongated arm 12b. More particularly, hook portions 22 positioned along the length of the first elongated arm 12a are situated at distances that vary from hook portions 22 that are situated along the length of the second elongated arm 12b. Accordingly, it is a separate aspect of the present invention to provide hook portions 22 that not only vary in terms of being upwardly projecting and downwardly projecting, as well as varying in terms of length, but that also vary in terms of their relative positions along the lengths of the first elongated arm 12a and the second elongated arm 12b.

Referring now to FIG. 13, the modified adjustable carrier 10 depicted in FIG. 12 is shown restraining an object $T_1$ using a single strap 30. Here, the strap 30 is interwoven through two apertures 20 along the first elongated arm 12a and engaged with two hook portions 22 also along the first elongated arm 12a. Therefore, adjustable carrier 10 may be used to restrain a single object to the interior surface 36 of either the first elongated arm 12a or the second elongated arm 12b.

Referring now to FIG. 14, the modified adjustable carrier 10 illustrated in FIG. 12 is shown restraining two objects $T_1$ and $T_2$ to the interior surface 36 of the first elongated arm 12a using a single strap 30. More particularly, objects $T_1$ and $T_2$ are restrained against the interior surface 36 of the first elongated arm 12a by interweaving resilient strap 30 through apertures 20 within the first elongated arm 12a and engaging apertures 32 of resilient strap 30 with hook portions 22 of the first elongated arm 12a.

Finally, FIG. 15 depicts an alternative embodiment of the present invention, wherein the plurality of apertures 20 are replaced with one or more slots 38 positioned in the first or second elongate arms 12, or both. These slots facilitate the insertion of the strap 30 making the carrier easier to use with certain types of tools.

In summary, the present invention is an adjustable carrier adapted for attachment to a vehicle wherein the adjustable carrier can releasably restrain an object. The adjustable carrier includes a first elongated arm having an upper end and a lower end, and the second elongated arm also having an upper end and a lower end. The first elongated arm and the second elongated arm are interconnected by a base at the lower end of the first elongated arm and the second elongated arm. The first elongated arm and the second elongated arm include at least one aperture or slot, and more preferably a plurality of apertures or slots positioned between their upper ends and their lower ends. In addition, the first elongated arm and the second elongated arm include at least one hook portion, but preferably include a plurality of hook portions situated between their upper ends and their lower ends. The hook portions may be upwardly projecting or downwardly projecting. In addition, the hook portions along the exterior surface of the first elongated arm may vary in position relative to the position of the hook portions along the exterior surface of the second elongated arm. Hook portions may also vary in length.

A strap having at least one, but preferably a plurality of apertures, is used to engage one of the hook portions along either the first elongated arm or the second elongated arm and may be rope, webbing material, cable, etc. Preferably the strap is resilient, and is made from rubber or other similar materials. In addition, attachment means for interconnecting the base of the adjustable carrier to a vehicle is encompassed within the scope of the invention.

The adjustable carrier of the present invention may be used to carry one or more objects between the first elongated arm and the second elongated arm, and may also be used to carry one or more objects to the exterior of either or both the first elongated arm or second elongated arm. Finally, the adjustable carrier of the present invention may be adjusted in terms of its width by manipulating the position of one or both of the first elongated arm or second elongated arm, thereby providing a narrower or wider separation between the first elongated arm and the second elongated arm for accommodating objects of various width.

For clarity purposes, a following is a list of components and the associated numbering depicted in the drawings:

| # | Component |
|---|---|
| 10 | Adjustable carrier |
| 12a/b | First/second elongate arms |
| 14a/b | Upper end |
| 16a/b | Lower end |
| 18 | Base |
| 20 | Plurality of apertures |
| 22 | Plurality of hooks |
| 24 | Attachment means |
| 26 | Cushion |
| 28 | Flexible arrows |
| 30 | Strap |
| 32 | Openings |
| 34 | Exterior surface |
| 36 | Interior surface |
| 38 | Slot |

While various modifications of the present invention have been described in detail, it is apparent that further modifications and adaptations will occur to those skilled in the art. However, it is to be expressly understood that such modifications and adaptations are within the spirit and scope of the present invention, as set forth in the following claims.

What is claimed is:

1. An adjustable carrier adapted for attachment to a vehicle and for selectively holding at least one object, comprising:

a first elongated arm having an upper end, a lower end, an interior surface and an exterior surface;

a second elongated arm having an upper end, a lower end, an interior surface and an exterior surface;

a base operably interconnecting said lower end of said first elongated arm and said lower end of said second elongated arm;

a plurality of apertures positioned between said upper end and said lower end of said first elongated arm and said second elongated arm;

a plurality of hook portions interconnected to said exterior surface of said first elongated arm and said second elongated arm, said plurality of hook portions projecting outwardly from said first elongated arm and said second elongated arm;

a resilient strap having a width adapted to pass through at least one of said plurality of apertures in said first elongated arm and said second elongated arm, said resilient strap having a plurality of apertures adapted for engaging at least one of said plurality of hook portions; and an attachment means for interconnecting said base to said vehicle;

wherein said resilient strap may be operably interwoven through said plurality of apertures in said first elongated arm or said second elongated arm to selectively interconnect the object to said interior surface or said exterior surface of at least one of said first elongated arm or said second elongated arm.

2. The adjustable carrier as claimed in claim 1, wherein said first elongated arm, said second elongated arm and said base comprise a plastic coated metal or a plastic coated metal alloy.

3. The adjustable carrier as claimed in claim 1 wherein said plurality of hook portions vary in length.

4. The adjustable carrier as claimed in claim 1, wherein at least one of said plurality of hook portions generally projects downwardly.

5. The adjustable carrier as claimed in claim 1, wherein at least one of said plurality of hook portions generally projects upwardly.

6. The adjustable carrier as claimed in claim 1, wherein said first elongated arm and said second elongated arm are selectively deflectable to a plurality of positions.

7. The adjustable carrier as claimed in claim 1, wherein said attachment means comprises a clamp, a bolt, and a nut.

8. The adjustable carrier as claimed in claim 1, wherein said first elongate arm, said second elongated arm and said base are at least partly coated with at least one of a plastic, a rubber, and a vinyl material, wherein the at least one object is protected from being scratched.

9. The adjustable carrier as claimed in claim 1, wherein at least a portion of said first elongated arm, said second elongated arm and said base are coated with at least one of a plastic, a rubber, a vinyl, and a cloth material.

* * * * *